United States Patent
Jarvis et al.

(10) Patent No.: US 7,421,535 B2
(45) Date of Patent: Sep. 2, 2008

(54) METHOD FOR DEMOTING TRACKS FROM CACHE

(75) Inventors: Thomas Charles Jarvis, Tucson, AZ (US); Michael Howard Hartung, Tucson, AZ (US); Karl Allen Nielsen, Tucson, AZ (US); Jeremy Michael Pinson, Tucson, AZ (US); Steven Robert Lowe, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/843,150

(22) Filed: May 10, 2004

(65) Prior Publication Data

US 2005/0251628 A1   Nov. 10, 2005

(51) Int. Cl.
*G06F 12/00* (2006.01)
*G06F 12/16* (2006.01)

(52) U.S. Cl. ............. 711/113; 711/112; 711/111; 711/101; 711/118; 711/135

(58) Field of Classification Search ............ None
See application file for complete search history.

(56) References Cited

U.S. PATENT DOCUMENTS

| | | | |
|---|---|---|---|
| 4,916,605 A * | 4/1990 | Beardsley et al. ......... 711/162 |
| 5,636,359 A | 6/1997 | Beardsley et al. |
| 5,815,656 A | 9/1998 | Candelaria et al. |
| 5,941,998 A * | 8/1999 | Tillson ................... 714/54 |
| 6,044,444 A | 3/2000 | Ofek |
| 6,119,209 A * | 9/2000 | Bauman et al. .......... 711/162 |
| 6,134,610 A * | 10/2000 | Chung .................... 710/55 |
| 6,134,634 A * | 10/2000 | Marshall et al. ......... 711/143 |
| 6,425,050 B1 * | 7/2002 | Beardsley et al. ........ 711/113 |
| 6,567,888 B2 | 5/2003 | Kedem |
| 2002/0199067 A1 * | 12/2002 | Patel et al. .............. 711/145 |

OTHER PUBLICATIONS

American National Standard, "Information Technology—SCSI Block Commands—2 (SBC-2)", Working Draft, Project T10/1417-D, Revision 13, Mar. 20, 2004, pp. 80-82 and 93-95.

* cited by examiner

*Primary Examiner*—Hong Kim
*Assistant Examiner*—Samuel Dillon
(74) *Attorney, Agent, or Firm*—David Victor; Konrad Raynes & Victor, LLP

(57) ABSTRACT

Provided are a method, system, and program for destaging a track from cache to a storage device. The destaged track is retained in the cache. Verification is made of whether the storage device successfully completed writing data. Indication is made of destaged tracks eligible for removal from the cache that were destaged before the storage device is verified in response to verifying that the storage device is successfully completing the writing of data.

9 Claims, 6 Drawing Sheets

Track Metadata

Head Verify Entry

METHOD FOR DEMOTING TRACKS FROM CACHE

BACKGROUND OF THE INVENTION

1. Field of the Invention

The present invention relates to a method, system, and program for demoting tracks from cache.

2. Description of the Related Art

When data is successfully written to a hard disk drive, the drive returns a write complete message to the host system that initiated the write operation. However, if the read/write head of the hard disk drive is not operating properly, the disk drive may return a write complete without actually writing the data to the disk. In large enterprise storage systems, the disk drive may return a complete to a destage of updated data to the drives. If the read/write head does not write the data even though complete is returned, the data is lost and recovery may not be possible using error correction techniques or Redundant Array of Independent Disk (RAID) algorithms because the data was never written to the disk. This type of error is called a "dropped write" error. Further, once a read/write head starts dropping writes, typically all writes following the failed write will also be dropped.

Dropped write errors may corrupt the parity data because the parity data for the dropped write is inconsistent with the data on the drive, which does not include the dropped write. Subsequently calculated parity based on the block to which the dropped data should have been written would be corrupt because it is not calculated using the dropped data, thereby preventing recovery and reconstruction of the dropped data using the parity data.

SUMMARY

Provided are a method, system, and program for destaging a track from cache to a storage device. The destaged track is retained in the cache. Verification is made of whether the storage device successfully completed writing data. Indication is made of destaged tracks eligible for removal from the cache that were destaged before the storage device is verified in response to verifying that the storage device is successfully completing the writing of data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
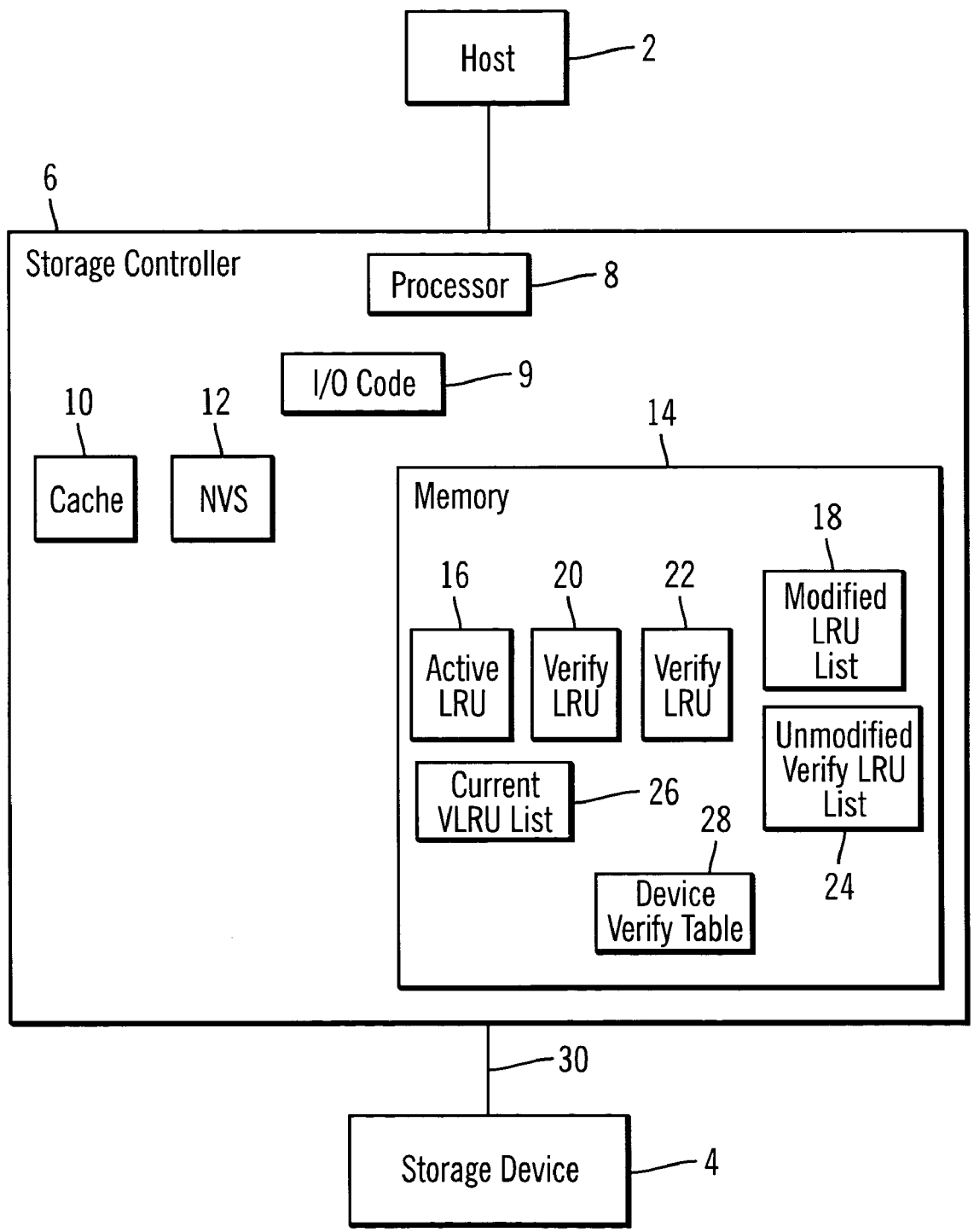
FIG. 1 illustrates a computing environment in which embodiments are implemented.

FIG. 1 illustrates a computing environment in which aspects of the invention are implemented. A host system 2 communicates Input/Output (I/O) requests to a storage device 4 through a storage controller 6. The host 2 may communicate with the storage controller 6 via a network, such as a Local Area Network (LAN), Storage Area Network (SAN), Wide Area Network (WAN), wireless network, etc. Alternatively, the host 2 may communicate with the storage controller 6 over a bus interface, such as a Peripheral Component Interconnect (PCI) bus. The host 2, storage system 8, and storage controller 6 may be housed in separate housings or be included in the same housings and connect via one or more bus interfaces. The storage controller 6 may comprise any storage management system known in the art, such as a storage controller, server, enterprise storage server, etc. Still further, the storage controller 6 may be implemented in a chip set in the host 2 or in an expansion card in an expansion card slot of the host 2. Yet further, the host 2 and storage controller 6 may comprise blades in a blade server. The storage device 4 may comprise any storage system known in the art, such as a single storage unit, e.g., hard disk drive, tape drive, optical disk drive, etc., or a Direct Access Storage Device (DASD), Just a Bunch of Disks (JBOD), a Redundant Array of Independent Disks (RAID), virtualization device, tape storage, optical disk storage, or any other storage system known in the art. The host 2 may comprise any computing device known in the art, such as a workstation, desktop computer, server, mainframe, handheld computer, telephony device, etc.

The storage controller 6 may include a processor 8 and a cache 10. The cache 10 is comprised of one or more volatile memory devices. The storage controller 6 buffers updates to data blocks in the storage device 4 in the cache 10 before writing the updates to the storage device. A "data block" comprises any known accessible unit of data known in the art, such as a byte at a Logical Block Address (LBA), a track, a fraction of a byte, etc. Data stored in the cache 10 may also be backed up in a non-volatile storage unit 12. The I/O code 9 includes the code to manage the storage of data in the cache 10 and the destaging of data to the storage device 4.

The storage controller 6 further includes a memory 14 or some type of buffers maintaining the following queues and data structures to manage I/O requests, including:

Active Least Recently Used (LRU) List 16: includes entries associated with received I/O requests that are actively being processed and the data for such I/O requests remains in cache 10.

Modified LRU List 18: includes entries associated with a write request whose data to write to the storage device 4 remains in cache 10 and has not yet been destaged from cache 10.

Verify LRU Lists 20, 22: includes entries associated with write data remaining in cache 10 after the write data is destaged and completed but before the write to the storage device 4 has been verified.

Unmodified Verify LRU List 24: includes entries associated with a write request previously on one of the verify LRU lists 20, 22 whose data was verified as being written to the storage device 4 and is eligible for demotion from the cache 10.

Current Verify LRU (VLRU) List 26: Indicates the current verify LRU list 20, 22 to which entries are added that are associated with write data written to the storage device 4 that is not yet verified.

Device Verify Table 28: In hard disk drive embodiments, includes information for each read/write head in a hard disk drive indicating whether the read/write head has written data and whether the read/write head was verified.

Figure 2:
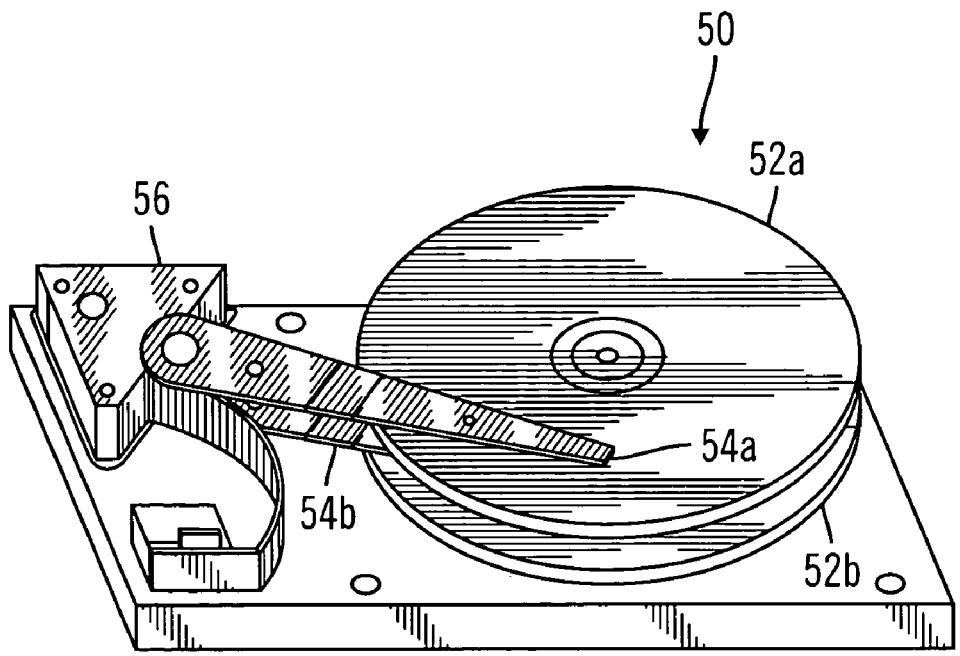
FIG. 2 illustrates a hard disk drive as known in the prior art.

FIG. 2 illustrates components of a hard disk drive 50 as known in the art, including a plurality of platters 52a, 52b, which may include data on both sides of the platters 52a, 52b, and read write heads 54a, 54b, where there may be heads on both sides of every platter 52a, 52b. Disk drive electronics 56 position the read/write heads at different locations on the platters 52a, 52b to perform read/write and other disk operations.

Figure 3:
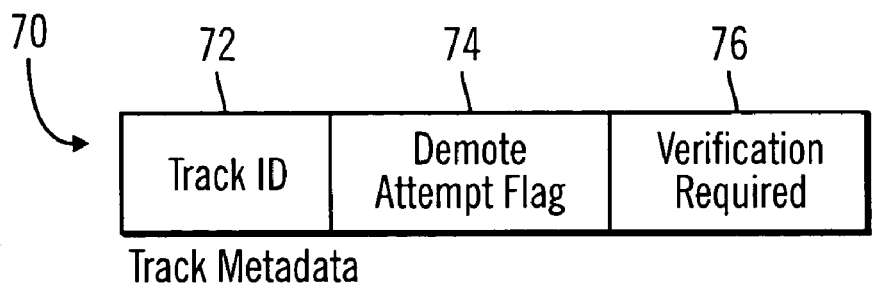
FIGS. 3 and 4 illustrate track metadata and head verify information.

FIG. 3 illustrates an example of track metadata 70 maintained for each track in cache 10, where entries associated with the track may be on one of the LRU lists 16, 18, 20, 22, 24. The track metadata 70 includes a track identifier (ID) 72 identifying the track in cache 10, a demote attempt flag 74 indicating whether an attempt was made to demote the track from cache 10 before the storage device 4 was verified; and a verification required flag 76 indicating whether the track must be verified as having been written to the storage device 4 before being eligible for demotion.

Figure 4:
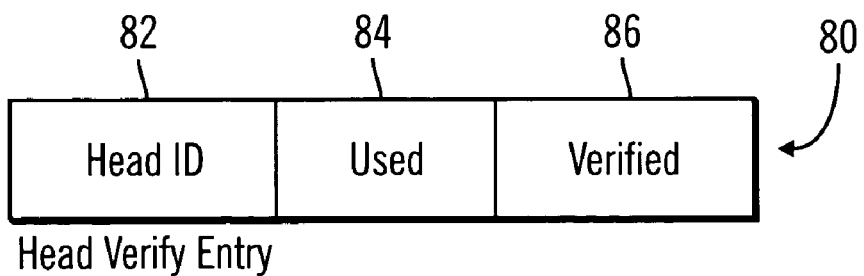
Figure 5:
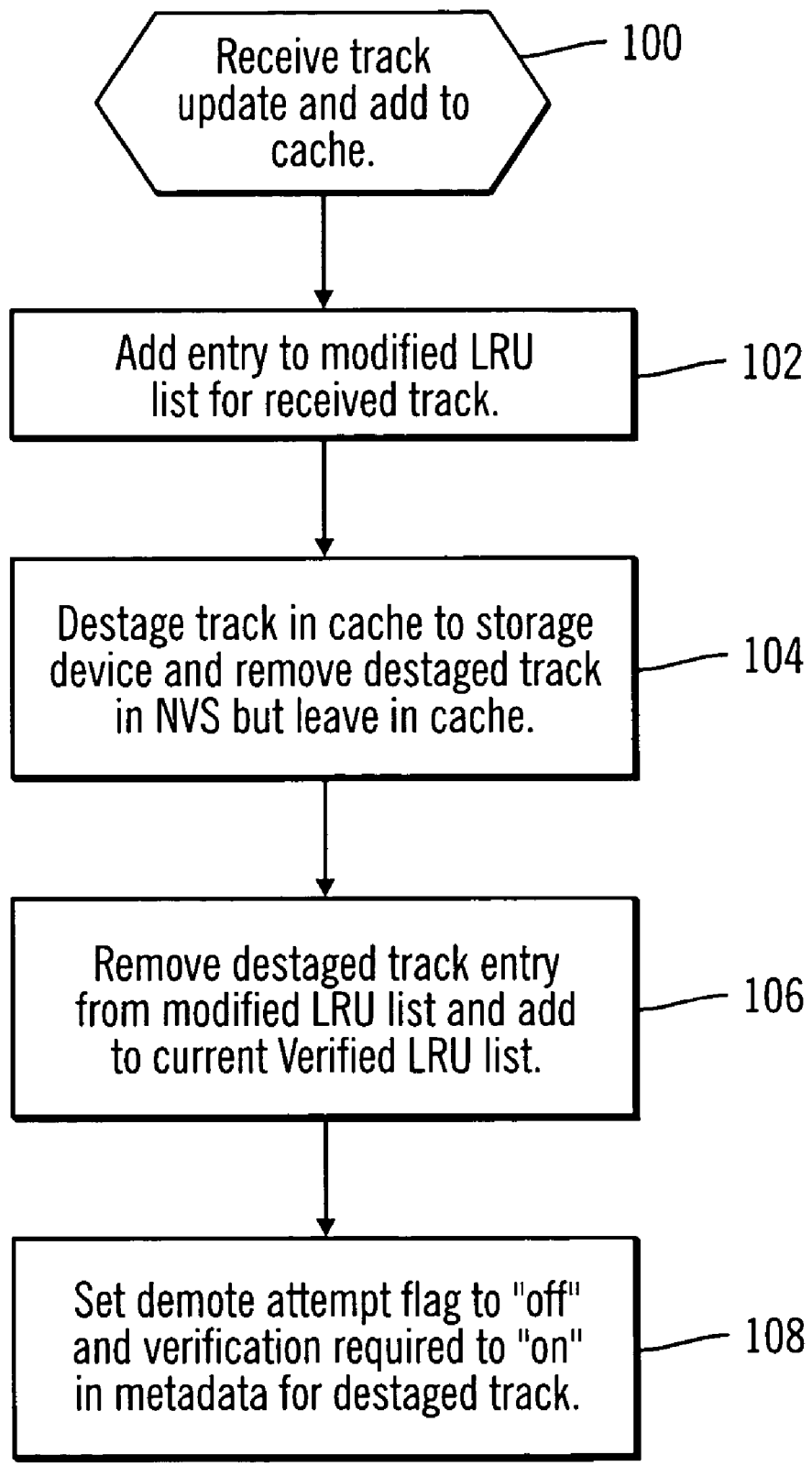
FIGS. 5, 6, 7, and 8 illustrate operations to destage and demote data in cache.

FIG. 4 illustrates an example of an entry 80 in the device verify table 28 maintained for each read/write head in the storage device that needs to be verified. The entries include a head identifier (ID) 82 identifying a particular head in a disk drive unit. If there are multiple disk drives in the storage device 4, then the head ID 82 would identify the particular disk drive in which the head is included. A used flag 84 indicates whether the head was used and a verify flag 86 indicates whether the head was verified. A write to the storage device 4 is verified if all heads have been have been verified since the write data was in cache 10 pending the verification.

FIGS. 5, 6, 7, and 8 illustrate operations performed by storage controller 6 executing the I/O code 9 to manage updates to tracks in the storage device 4 in the cache 10. With respect to FIG. 5, control begins upon receiving (at block 100) a track update and adding the update to cache 10. An entry is added (at block 102) to the modified LRU list 18 for the received track. The track in cache 10 is then destaged (at block 104) to the storage device 4 and the destaged track is removed from the NVS 12 but left in cache 10 until the heads of the storage device 4 are verified. The destaged track entry is removed (at block 106) from the modified LRU list 18 and added to the current verified LRU list 20, 22 indicated in the current VRLU list 26. The verification required flag 76 for the track is set (at block 108) to "on" indicating that the heads need to be verified before the track may be demoted and the demote attempt flag 74 is set to "off" indicating that an attempt has not been made to demote the track in cache 10 while the track is waiting verification that the data was successfully written, which means in certain embodiments, that all the heads being used were verified.

In certain situations, an update may be received to a track having an entry in one of the VLRU lists 20 and 22. In such case, the updated track entry may be removed from the VLRU list 20, 22 and then added to the modified LRU list 18 and processed accordingly.

Figure 6:
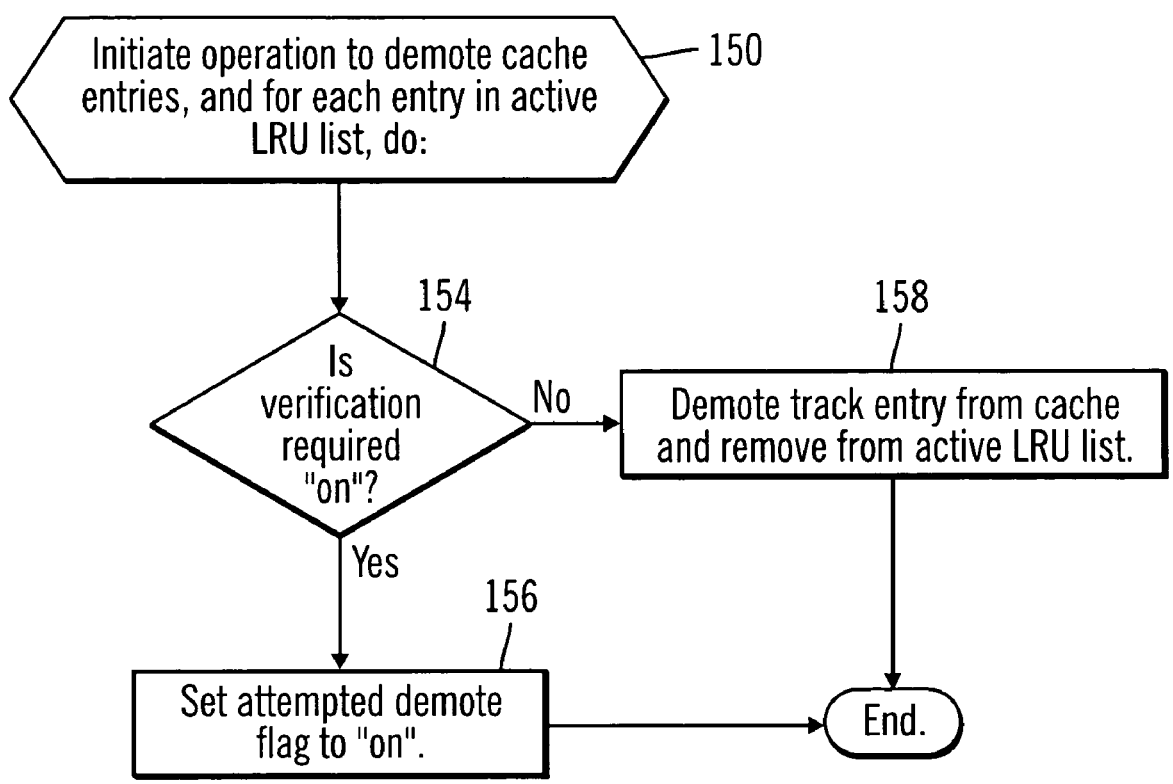

FIG. 6 illustrates operations to demote tracks in cache 10, where tracks may be demoted as part of an LRU operation to make room for new tracks being staged into cache 10. In certain embodiments, tracks are not subject to demotion from cache 10 until they have been destaged to the storage device 4. For each track entry in the active LRU list 16 (at block 150), operations 154, 156, and 158 are performed. If (at block 154) the verification required flag 76 in the track metadata 70 for the accessed track entry in the active LRU list 16 indicates that verification is needed, then the demote attempt flag 74 is set (at block 156) "on". This indicates that an attempt to demote the track from cache 10 was made, but that the demotion failed because the track had not yet been verified. If the verification required 76 flag is "off, then the track entry from cache 19 is demoted (at block 158) and the entry for the demoted track is removed from the active LRU list 16.

Figure 7:
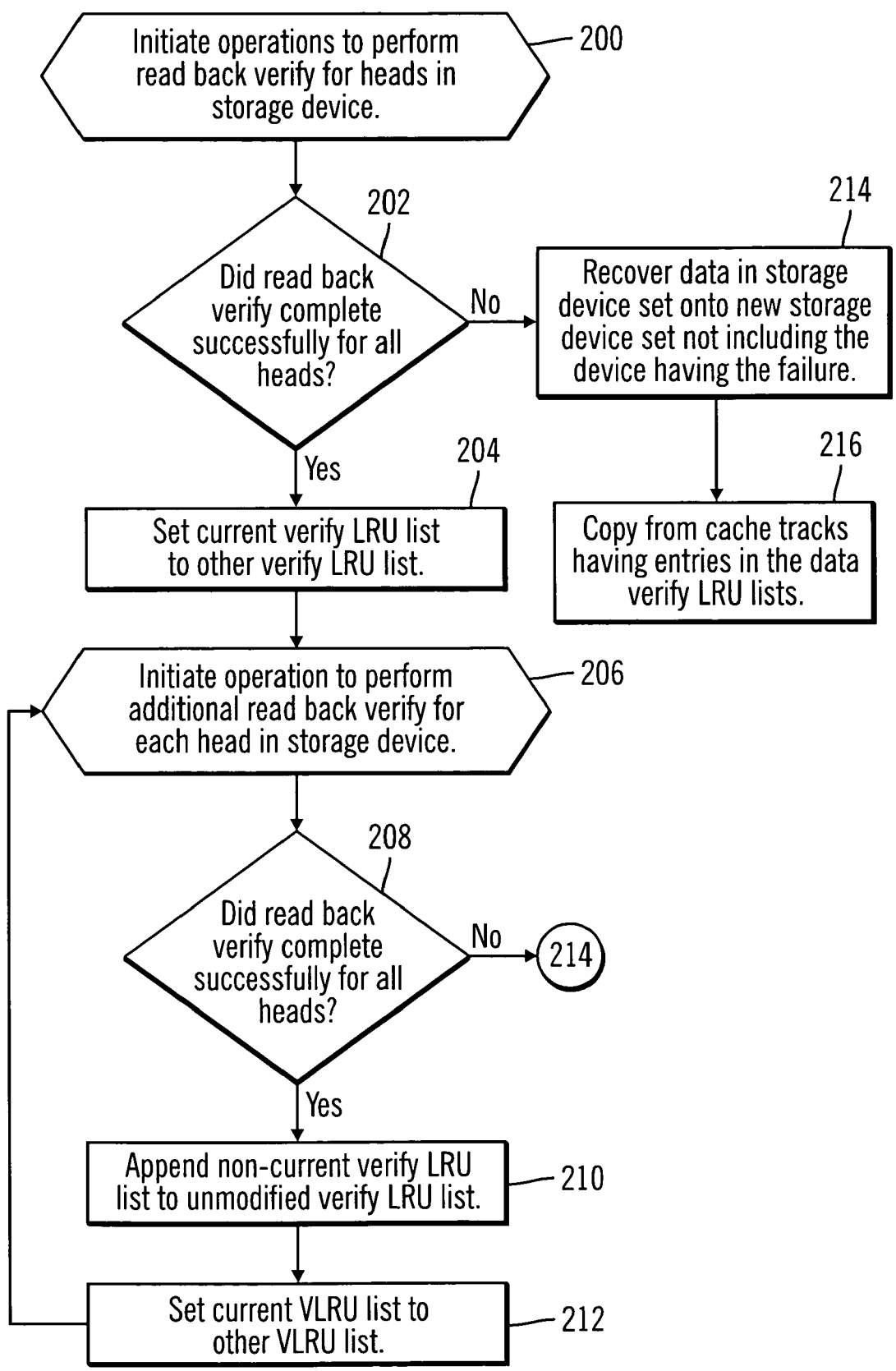

FIG. 7 illustrates operations performed to verify that the data was successfully written, or that the read/write heads are working properly. At block 200, the storage controller 6 initiates operations to perform write and read back verify for heads in the storage device. For instance, the storage controller 6 may periodically perform a read back verify of an update written to the storage device 4 and when doing the read back verify determine which head was verified. In certain embodiments, only heads that have been used are subject to verification, as indicated in the used 84 field. The verify flag 86 for that head on which the read back verify was performed is then set to "on". For instance, if the connection between the storage controller 6 and storage device 4 is the Small Computer System Interface (SCSI), then the SCSI SEND DIAGNOSTIC and RECEIVE DIAGNOSTIC may be used to determine the read/write head through which the read back data is verified. The SCSI WRITE AND VERIFY command may be used to perform the write and read back of the data to verify that the data was written correctly to the storage device 4. These commands are further described in the publication "SCSI Block Commands-2 (SBC-2)", Rev. 13, Mar. 20, 2004 (Copyright 2003 by Information Technology Industry Council (ITI)), which publication is incorporated herein by reference in its entirety. In alternative embodiments, alternative techniques may be used to determine which head was used for the write and read back verify operation. The storage device 4 is verified once all read/write heads currently being used are verified, as indicated by the verified flag 86 and used flag 84 for each head. If all the heads are not verified within a certain period of time by periodically performing the read back verify of data destaged from cache, then a write and read back verify may be performed with respect to all heads not yet checked after the time period has expired.

If (at block 202) the read back verify completed successfully for all heads being used, then the current VLRU list 26 is set (at block 204) to the other verify LRU list 20 or 22 not currently being used. After this first verify operation of all used heads, the storage controller 6 initiates operations (at block 206) to perform an additional read back verify for each used head in the storage device 4. If (at block 208) this second or any further subsequent read back verify for all heads completes, then the storage controller 6 appends (at block 210) the entries in the verify LRU list 20 or 22 not indicated in the current VRLU list 26 to the unmodified verify LRU list 24. The current VLRU list 26 is set (at block 212) to point to the other verify LRU list 20 or 22. Control then returns to block 206 to perform another verification of all the heads in the storage device. Whenever a new verification operation of all used heads is performed, the verified flag 86 for all the used heads are cleared.

With these operations, entries in the VLRU list 26 are not considered verified until the verification of the heads occurs twice. The reason for using two checks to verify the successful writing of tracks having entries in one VLRU list 20, 22 is that an entry for a track in cache 10 may be added to one VLRU list 20, 22 while the head verification is occurring, but before the verification completes, meaning that the data was not written before the head was verified. The second verification is performed so that entries added to a VLRU list 20 or 22 while a check of all the heads is occurring are not verified and demoted from cache 10 until a check of all the storage device 4 heads occurs after an entry is added to one VLRU 20 or 22 list. This ensures that the entry added to a VLRU list 20, 22 associated with an updated track that is written on a head is not verified until the head on which the data is written is verified in the second verification after the data is written.

If (at block 202 or 208) the read back for one head fails, then the storage device 4 is at risk for write dropping errors. In such case, data in the storage device set of storage units, such as hard disk drives, is recovered onto new storage device set not including the device, i.e., hard disk drive, having the head failure. For instance, if the storage device 4 comprises a set of interconnected hard disk drives configured as a RAID array, then the disk having the failed head may be swapped out and the data rebuilt using the RAID algorithm from the surviving disks. Updates in the cache 10 on the verify lists 20, 22, 24, which comprise updates to tracks in the storage device 4 that have not been verified as successfully written, are then written (at block 216) from the cache 10 to the storage device 4 to ensure that data not verified to be in the storage device 4 is written back. In this way, data that has been verified as being stored in the disk may be recovered and updates not verified as successfully written to the storage device 4 are recovered from cache 8 as indicated in the verify lists 20, 22, 24.

Figure 8:
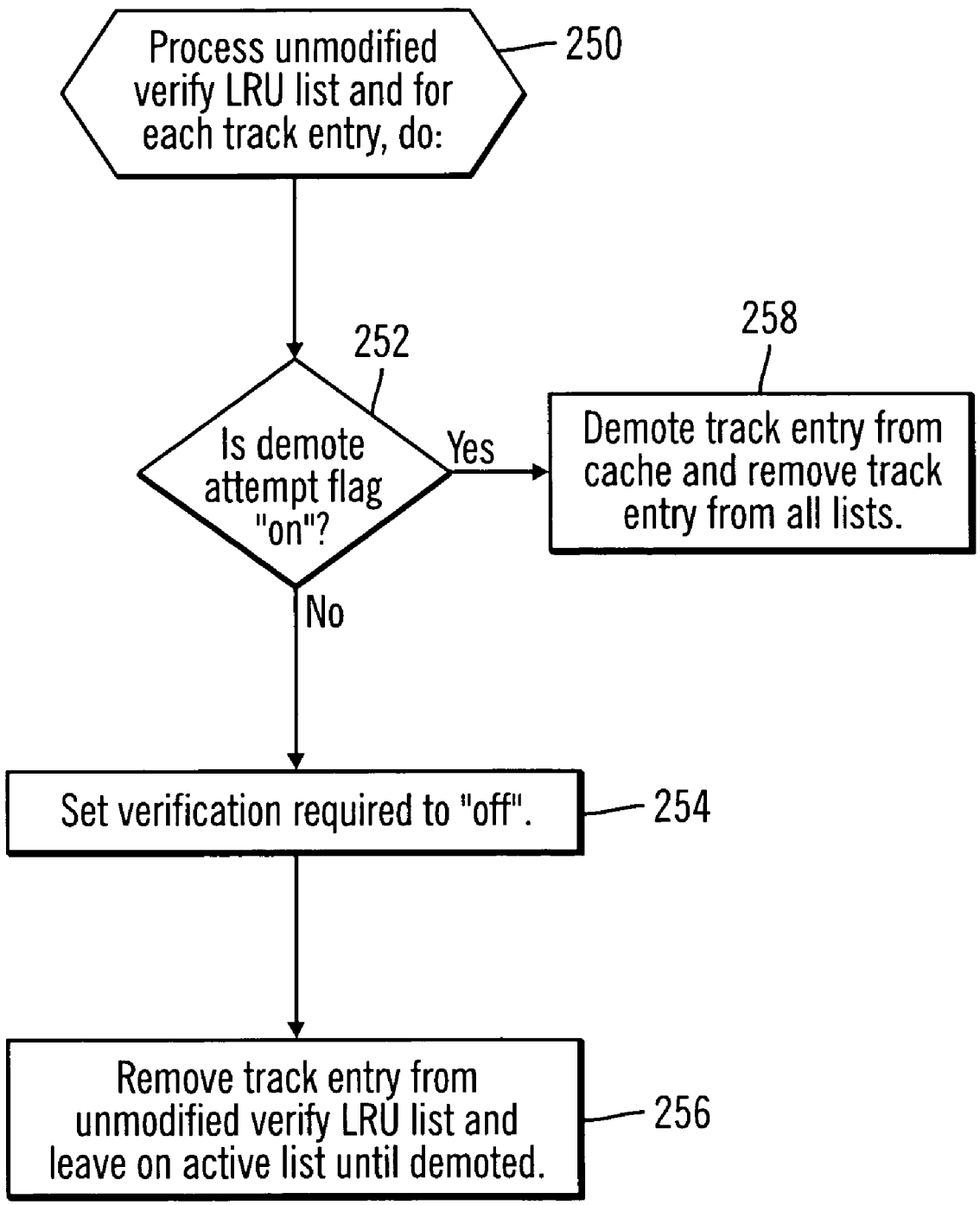

FIG. 8 illustrates operations for processing the unmodified VLRU list 24. For each entry in the unmodified VLRU list 24 (at block 250), the operations 252-258 are performed. If (at block 252) the demote attempt flag 74 is on, then the track is immediately demoted (at block 258) and the entry from all other lists for the demoted track is removed. This ensures that those tracks where demotion was previously attempted are immediately demoted to avoid further delays to writing the update of that track. If the demote attempt flag 74 is "off", then the verification required flag 76 is set (at block 254) to "off" and the track entry is removed (at block 256) from the unmodified verify LRU list 24 and left on the active list 16 eligible for demotion.

Described embodiments provide techniques for ensuring that data destaged to a storage device is removed from cache after the verifying that the storage device successfully completed writing the data to detect and avoid the drop write errors.

Additional Embodiment Details

The described embodiments for copying data between controllers may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the data was verified by checking all read/write heads through which the data is written. In alternative embodiments, different techniques may be used to verify that data was successfully written to the storage device other then verifying the operability of the read/write heads being used.

FIGS. 3 and 4 illustrate information maintained for track metadata and for a head verify information. In alternative embodiments, additional or different information may be maintained.

The illustrated operations of FIGS. 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

destaging tracks from cache to a storage device;

adding indication of destaged tracks retained in the cache to a first verify list in response to destaging the tracks;

retaining the destaged tracks in the cache;

performing a first verification to verify that the storage device is successfully completing writing data;

adding indication of multiple destaged tracks that are destaged during the first verification to the first verify list;

adding indication of destaged tracks that are destaged from the cache to a second verify list in response to successfully completing the first verification verifying that the storage device is successfully completing the writing of data;

initiating a second verification of the storage device in response to completing the first verification operation;

adding indication of destaged tracks destaged during the second verification to the second verify list; and indicating destaged tracks indicated in the first verify list eligible for removal from the cache in response to successfully completing the second verification.

2. The method of claim 1, wherein the storage device comprises a hard disk drive having multiple read/write heads, wherein the read/write head performs read/write operations with respect to one disk platter, and wherein the storage device is verified after verification that the storage device has successfully completed the writing of data to the read/write heads in the hard disk drive.

3. The method of claim 2, wherein verifying the read/write heads comprises:

periodically performing a write and read back to verify one read/write head; and verifying read/write heads not yet verified in response to determining that used read/write heads have not been verified within a predetermined time period.

4. The method of claim 1, further comprising:

adding the tracks indicated in the first verify list to a third verify list in response to completing the second verification indicating that the storage device is successfully completing the writing of data; and processing the tracks in the third verify list to indicate the tracks in the third verify list eligible for removal from the cache.

5. A method, comprising:

destaging tracks from cache to a storage device;

retaining the destaged tracks in the cache;

adding indication of destaged tracks retained in the cache to a first verify list in response to destaging the tracks;

performing a first verification to verify that the storage device is successfully completing writing data;

adding indication of destaged tracks that are destaged after successfully completing the first verification verifying that the storage device is successfully completing the writing of data to a second verify list;

indicating destaged tracks indicated in the first verify list eligible for removal from the cache that were destaged before the first verification in response to performing a second verification verifying that the storage device is successfully completing the writing of data;

receiving an update to a track indicated in one of the first and second verify lists;

removing indication of the updated track from the first or second verify list; and performing the operations of destaging the tracks from cache and retaining the destaged tracks in the cache in response to receiving the update to the tracks.

6. The method of claim 1, further comprising:

indicating to retain the destaged tracks in cache in response to destaging the tracks;

processing tracks in the cache to indicate as eligible for removal; and indicating tracks eligible for removal that are not indicated to retain in cache in response to processing the tracks.

7. The method of claim 6, further comprising:

indicating to not retain the destaged tracks that were destaged before the first verification in response to the second verification verifying that the storage device is successfully completing the writing of data; and demoting tracks not indicated to retain in cache that were subject to a previous demote attempt while indicated as retained in cache.

8. The method of claim 1, further comprising:

recovering the data from the storage device to a new storage device in response to not verifying that the storage device is successfully completing the writing of data; and writing the retained destaged tracks from the cache to the new storage device in response to recovering the data.

9. The method of claim 1, wherein the storage device comprises a plurality of interconnected storage units, wherein verifying that the storage device is successfully completing the writing of data comprises verifying that all interconnected storage units successfully complete writing data.

* * * * *